United States Patent
Piccoz et al.

(10) Patent No.: US 9,293,280 B2
(45) Date of Patent: Mar. 22, 2016

(54) MIXTURE OF HYDROFLUOROOLEFINE AND HYDROFLUOROCARBIDE TO IMPROVE THE INTERNAL ARC RESISTANCE IN MEDIUM AND HIGH VOLTAGE ELECTRIC APPARATUS

(71) Applicant: SCHNEIDER ELECTRIC INDUSTRIES SAS, Rueil-Malmaison (FR)

(72) Inventors: Daniel Piccoz, Lucenay (FR); Romain Maladen, Saint Cyr sur Menthon (FR); Manuel Ferreira Da Costa, Creches sur Saone (FR)

(73) Assignee: SCHNEIDER ELECTRIC INDUSTRIES SAS, Rueil-Malmaison (FR)

( * ) Notice: Subject to any disclaimer, the term of this patent is extended or adjusted under 35 U.S.C. 154(b) by 33 days.

(21) Appl. No.: 14/370,378

(22) PCT Filed: Mar. 14, 2013

(86) PCT No.: PCT/FR2013/050526
§ 371 (c)(1),
(2) Date: Jul. 2, 2014

(87) PCT Pub. No.: WO2013/136015
PCT Pub. Date: Sep. 19, 2013

(65) Prior Publication Data
US 2014/0346145 A1 Nov. 27, 2014

(30) Foreign Application Priority Data
Mar. 16, 2012 (FR) ..................................... 12 00802

(51) Int. Cl.
*H01H 33/22* (2006.01)
*H01B 3/56* (2006.01)
*H01H 33/56* (2006.01)
*H01H 33/64* (2006.01)
*H02B 13/055* (2006.01)

(52) U.S. Cl.
CPC .................. *H01H 33/22* (2013.01); *H01B 3/56* (2013.01); *H01H 33/562* (2013.01); *H01H 33/64* (2013.01); *H01H 2033/566* (2013.01); *H02B 13/055* (2013.01)

(58) Field of Classification Search
CPC . H01H 2033/566; H01H 33/22; H01H 33/91; H01H 33/95
See application file for complete search history.

(56) References Cited

U.S. PATENT DOCUMENTS

| | | | | | |
|---|---|---|---|---|---|
| 4,409,447 A | * | 10/1983 | Noeske | ................... | H01H 33/91 218/57 |
| 4,958,052 A | * | 9/1990 | Mahieu | .............. | H01H 33/7023 218/12 |
| 5,079,392 A | * | 1/1992 | Tsukushi | ............... | H01H 33/91 218/59 |
| 5,159,164 A | * | 10/1992 | Koyanagi | ........... | H01H 33/7023 218/51 |
| 5,723,840 A | * | 3/1998 | Bojic | ..................... | H01H 33/91 218/57 |
| 6,593,538 B2 | * | 7/2003 | Perret | ................... | H01H 33/143 218/3 |
| 7,754,991 B2 | * | 7/2010 | Bessede | ................. | H01H 33/22 218/158 |
| 7,816,618 B2 | * | 10/2010 | Uchii | ..................... | H01H 33/56 218/43 |
| 2006/0254791 A1 | | 11/2006 | Hama et al. | | |
| 2008/0135817 A1 | | 6/2008 | Luly et al. | | |
| 2009/0095717 A1 | | 4/2009 | Luly et al. | | |
| 2010/0320428 A1 | | 12/2010 | Luly et al. | | |
| 2011/0232939 A1 | | 9/2011 | Luly et al. | | |
| 2011/0309715 A1 | | 12/2011 | Claessens et al. | | |
| 2012/0145521 A1 | | 6/2012 | Glasmacher | | |

FOREIGN PATENT DOCUMENTS

| | | |
|---|---|---|
| DE | 20 2009 009 305 | 12/2009 |
| EP | 1 724 802 | 11/2006 |
| FR | 1 158 456 | 6/1958 |
| FR | 2 975 820 | 11/2012 |
| FR | 2 977 707 | 1/2013 |
| WO | WO 2008 073790 | 6/2008 |
| WO | WO 2009 049144 | 4/2009 |
| WO | WO 2010 142346 | 12/2010 |

OTHER PUBLICATIONS

International Search Report Issued Jul. 4, 2013 in PCT/FR13/050526 filed Mar. 14, 2013.
U.S. Appl. No. 14/119,352, filed Feb. 11, 2014, Kieffel et al.
U.S. Appl. No. 14/130,786, filed Jan. 3, 2014, Kieffel et al.
U.S. Appl. No. 14/346,597, filed Mar. 21, 2014, Kieffel et al.

* cited by examiner

*Primary Examiner* — Truc Nguyen
(74) *Attorney, Agent, or Firm* — Oblon, McClelland, Maier & Neustadt, L.L.P.

(57) ABSTRACT

The invention relates to the use of a mixture of a hydrofluoroolefin and a hydrofluorocarbon, optionally combined with another fluorinated gas, as an electrical insulation medium and/or an electric arc extinguishing medium in a medium-voltage electrical apparatus. The invention also relates to a medium- or high-voltage electrical apparatus in which such a mixture provides electrical insulation and/or electric arc extinguishing.

19 Claims, No Drawings

MIXTURE OF HYDROFLUOROOLEFINE AND HYDROFLUOROCARBIDE TO IMPROVE THE INTERNAL ARC RESISTANCE IN MEDIUM AND HIGH VOLTAGE ELECTRIC APPARATUS

TECHNICAL FIELD

The present invention relates to the field of the electrical insulation and the extinguishing of electrical arcs in medium voltage apparatuses.

More specifically, it relates to the use of a mixture comprising a specific alkene, namely a hydrofluoroolefin with three carbon atoms, and a hydrofluorocarbide, also named hydrofluorocarbon as arc insulation and/or extinguishing medium in high or medium voltage substation electrical apparatuses. The mixture can comprise other gases, the global warming potential of which is very low, in particular less than or equal to one.

It also relates to medium or high voltage substation electrical apparatuses in which the electrical insulation and/or electric arc extinguishing are ensured by a gas mixture comprising at least one hydrofluorocarbon and one hydrofluoroolefin.

Such an electrical apparatus can notably be an electrical transformer, such as a main or instrument transformer, a line with gas insulation for transporting or distributing electricity, a bus or also a connecting/disconnecting electrical apparatus (also known as switchgear), such as a circuit breaker, an interrupter, an interrupter/fuses combination, a breaker, an earthing switch or a contactor.

STATE OF THE PRIOR ART

In medium voltage MV electrical apparatuses (for example: voltage of greater than 1000 volts in alternating current and than 1500 volts in direct current, and less than 52 000 volts in alternating current and 75 000 volts in direct current) or high voltage HV electrical apparatuses (notably strictly greater than 52 000 volts in alternating current and than 75 000 volts in direct current), the electrical insulation and, if appropriate, the extinguishing of electrical arcs are typically ensured by a gas which is confined inside their chamber. Currently, the gas most often used is sulfur hexafluoride ($SF_6$): this gas exhibits a relatively high dielectric strength, a good thermal conductivity and relatively low dielectric losses. It is chemically inert and nontoxic to man and animals and, after having been broken down by an electrical arc, it rapidly and virtually completely recombines. Furthermore, it is nonflammable and its behavior, in the event of failure internal to the apparatus, commonly known as internal arc, is similar to that of the air; its cost is, even today, moderate.

However, $SF_6$ has the major disadvantage of exhibiting a global warming potential (GWP) of 22 800 (relative to $CO_2$ over 100 years) and a residence time in the atmosphere of 3200 years, which places it among the gases with a high greenhouse effect power. $SF_6$ has thus been included by the Kyoto Protocol (1997) on the list of gases whose emissions have to be limited.

The best way for limiting $SF_6$ emissions consists in limiting the use of this gas, which has led manufacturers to look for alternatives to $SF_6$. In fact, the other solutions, such as hybrid systems combining gas insulation with solid insulation (EP 1 724 802), increase the size of the electrical apparatuses in comparison with that allowed by insulation with $SF_6$; the disconnection in the oil or the vacuum requires an overhaul of the switchgears.

Dielectric gases are known: see, for example, WO 2008/073790. However, "simple" gases, such as air or nitrogen, which do not have a negative impact on the environment, exhibit a much lower dielectric strength than that of $SF_6$; their use for the electrical insulation and/or the extinguishing of electrical arcs in HV/MV apparatuses involves drastically increasing the size and/or the filling pressure of these apparatuses, which goes against the efforts which have been made in recent decades to develop compact electrical apparatuses, with an increasingly reduced bulk.

Mixtures of $SF_6$ and other gases, such as nitrogen or nitrogen dioxide, are used to limit the impact of $SF_6$ on the environment: see, for example, WO 2009/049144. Nevertheless, due to the high GWP of $SF_6$, the GWP of these mixtures remains very high. Thus, for example, a mixture of $SF_6$ and nitrogen in a ratio by volume of 10/90 exhibits a dielectric strength in alternating voltage (50 Hz) equal to 59% of that of $SF_6$ but its GWP is of the order of 8000 to 8650. Such mixtures thus cannot be used as gas with a low environmental impact.

Alternatively, fluorinated gases have been tested: see, in particular, fluoroketones, such as presented in WO 2010/142346, DE 20 2009 00935 or FR 2 975 820. However, it is desirable to have available alternatives to these compounds, the dielectric strength of which in negative injection is fairly low. Research studies have led to the envisaging of novel gases and gas mixtures which can be used in medium or high voltage electrical apparatuses which are currently marketed, instead of the $SF_6$ with which these apparatuses are generally filled, this being the case over the entire range of their operating temperatures, in particular at low temperatures: see, for example, FR 2 977 707 or the unpublished patent application FR 11 58456.

SUMMARY OF THE INVENTION

The invention thus provides an alternative for a gas having good electrical insulation and extinguishing properties for electrical arcs, having a low or zero impact on the environment and ensuring a good internal arc resistance of the apparatuses and consequently good protection of personnel.

In particular, the invention relates to the use of a gas medium comprising at least one hydrofluoroolefin and one hydrofluorocarbon (hydrofluorocarbide), with each at least 0.1% and preferably at least 1% by volume, as electrical insulation medium and/or medium for extinguishing electrical arcs in a medium or high voltage apparatus, the global warming potential of said medium being less by 90%, preferably 95% or even 99% of the global warming potential (GWP) of sulfur hexafluoride in the same pressure and temperature conditions.

The used hydrofluoroolefins (HFOs) are fluorinated alkenes having a carbon chain with three carbon atoms, preferably of $C_3H_2F_4$ or $C_3HF_5$ type, which are not toxic, which are not corrosive, which are not explosive, which have an ODP (Ozone Depletion Potential) of 0 and which have a GWP of less than 10. Preferably, HFO 1234ze is used as its decomposition in the presence of an arc does not produce hydrofluoric acid.

The used hydrofluorocarbons (HFCs) are haloalkanes of the family of the fluorocarbons, compounds of carbon, fluorine and hydrogen, which are not toxic, which are not corrosive, which are not explosive and which have an ODP of 0. Preferably, the hydrofluorocarbons used comprise two or three carbon atoms; they are notably heptafluoropropane, $C_3HF_7$, commonly known as HFC-227ea or R-227ea, pentafluoroethane, $C_2HF_5$, commonly known as HFC-125 or R-125, or 1,1,1,2-tetrafluoroethane, $C_2H_2F_4$, commonly known as HFC-134a or R-134a. Preferably, R-227ea is used, given that, even in the presence of oxygen, its decomposition products do not comprise perfluoroisobutene PFIB.

In fact, the addition of HFC to the HFOs having dielectric properties capable of making them replace $SF_6$ as arc insulation and/or extinguishing gas in high or medium voltage substation electrical apparatuses facilitates the internal arc resistance of said apparatuses.

In accordance with the invention, the mixture is such that its components are maintained in the gas state in the temperature and pressure conditions to which it is intended to be subjected once confined in the electrical apparatus. The mixture between hydrofluorocarbon and hydrofluoroolefin can thus be used alone; however, the mixture will generally be diluted with at least one other gas which does not belong to their families, if the boiling point does not make it possible to guarantee its maintenance in the gas state at a total pressure sufficient for certain applications which, for example, may require more than $10^5$ Pa.

In this case, according to the invention, the other gases used in the gas medium have a global warming potential of less than or equal to one; the carrier gas, or dilution gas, or buffer gas, preferably exhibits a very low boiling point, that is to say typically equal to or less than $-50°$ C. at standard pressure, and a dielectric strength which is at least equal to that exhibited by carbon dioxide. Preferably, the mixture comprises a gas of air, advantageously dry air, oxygen or carbon dioxide type or a mixture of these gases; alternatively, the carrier gas can comprise a fluoroketone, in particular with five carbons, such as $C_5{}_6F_{10}O$, in order to enhance the dielectric performance in positive injection. The overall GWP of the gas medium is in keeping with the partial pressures of each of its components; it is, according to the invention, less by 90% of that of $SF_6$, preferably 95% or even 99%, for example of the order of GWP≤2000, if possible GWP≤230.

Advantageously, so as to put the maximum amount of each of the gases without generating liquid phase at the minimum temperature of use of the apparatus, the composition of the gas medium will be defined according to Raoult's law for the minimum temperature of use of the apparatus, indeed even for a temperature slightly greater than this temperature, in particular by 3° C. In particular, for a ternary hydrofluorocarbon (HFC)/hydrofluoroolefin (HFO)/dilution gas mixture, the pressures of each constituent adhere to the equation:

$$P_{total} = \frac{P_{HFO} + P_{HFC}}{\frac{P_{HFO}}{SVP_{HFO}} + \frac{P_{HFC}}{SVP_{HFC}}} + P_{dilution\ gas}$$

with SVP=saturated vapor pressure of the gas concerned. More generally, for a mixture of N fluorinated gases with a dilution gas, the partial pressures $P_i$ of the N fluorinated gases will have to adhere to the equation:

$$P_{total} = \frac{\sum_{i=1}^{N} P_i}{\sum_{i=1}^{N} \frac{P_i}{SVP_i}} + P_{dilution\ gas}$$

with $SVP_i$=saturated vapor pressure of the fluorinated gas i.

In the preferred embodiments, the minimum temperature of use $T_{min}$ is chosen from: 0, −5, −10, −15, −20, −25, −30, −35 and −40° C.

Another subject matter of the invention is a high or medium voltage electrical apparatus which comprises a sealed chamber containing electrical components and a gas medium ensuring the electrical insulation and/or the extinguishing of electrical arcs in this casing, this gas medium comprising at least one hydrofluoroolefin and one hydrofluorocarbon. The characteristics of the gas medium are as described above with regard to its use.

According to the invention, this electrical apparatus can be an electrical transformer with gas insulation, such as, for example, a main transformer or an instrument transformer. The electrical apparatus can also be an aerial or underground line with gas insulation or a bus for transporting or distributing electricity. Finally, it can also be a connecting/disconnecting electrical apparatus (also known as switchgear), such as, for example, a circuit breaker, an interrupter, a breaker, an interrupter/fuses combination, an earthing switch or a contactor.

DETAILED DESCRIPTION OF SPECIFIC EMBODIMENTS

The invention is based on the use, with or without dilution gas ("buffer" gas, such as $CO_2$, air, and the like), with or without fluoroketones, of hydrofluorocarbons (HFCs) and hydrofluoroolefins (HFOs) with at least three carbon atoms.

Fluoroketones are ketones substituted by fluorine, which are nonflammable and which have a very low GWP; notably, the fluoroketones used have five carbon atoms (C5K), with the empirical formula $C_5F_{10}O$, and notably decafluoro-2-methylbutan-3-one, which corresponds to the semi-expanded formula $CF_3$—CO—CF—$(CF_3)_2$, with a global warming potential GWP=1, is selected. C5Ks do not exhibit toxicity to human with an average exposure value AEV (average limiting content to which the majority of workers can be regularly exposed at the rate of 8 hours of work for 5 days per week without being subjected to a harmful effect) of 1000 ppm and a lethal dose $LD_{50}$, causing the death of 50% of an animal population, of greater than 200 000 ppm.

HFOs are alkenes substituted by fluorine, of general formula $C_n(H,F)_{2n}$; in particular, the HFOs used comprise 3 carbon atoms; they are nonflammable and their GWP is less than 10. Notably, the hydrofluoroolefin HFO-1234ze, or trans-1,3,3,3-tetrafluoro-1-propene, which corresponds to the semi-expanded formula CHF=CH—$CF_3$, is used. Its environmental impact is GWP=6 and it does not exhibit toxicity to human with an AEV=1000 ppm and an $LD_{50}$>200 000 ppm. In point of fact, in the majority of the conventional applications at very low temperature (−30° C., indeed even −40° C.), HFO is diluted, sometimes to less than 20%, in a neutral carrier gas of nitrogen type: the mixture is thus not toxic. HFO-1234yf, or 2,3,3,3-tetrafluoro-1-propene, and HFO-1225ye, or 1,2,2,5-pentafluoro-1-propene, are also envisaged for the mixture according to the invention.

The HFCs are haloalkanes of the family of the fluorocarbons. The choice will preferably be made of HFCs for which the number of fluorine atoms, divided by the sum of the numbers of fluorine atoms and of hydrogen atoms, is as high as possible and in all cases greater than or equal to 66%; furthermore, the preferred HFCs are nontoxic to human and have the lowest possible boiling point and the lowest cost, that is to say are readily available on the various world markets. Although of zero ODP, the GWP of the HFCs is greater than 1000 and the preferred HFCs will thus have the lowest possible GWP, in particular from:

heptafluoropropane of semi-expanded formula $C_3HF_7$ and commonly known as HFC-227ea or R-227ea, the boiling point of which is −16.5° C. and the GWP of which is 3500;

pentafluoroethane of semi-expanded formula $C_2HF_5$ and commonly known as HFC-125 or R-125, the boiling point of which is −48° C. and the GWP of which is 3500;

1,1,1,2-tetrafluoroethane of semi-expanded formula $C_2H_2F_4$ and commonly known as HFC-134a or R-134a, the boiling point of which is −26.4° C. and the GWP of which is 1430.

According to the invention, the dielectric gas meets strict environmental conditions, with in particular a reduction in environmental impact a of the order of 0.10, indeed even 0.05 or even 0.01, that is to say a GWP reduced by 90%, indeed even 95% or even 99%, with respect to that of the $SF_6$ currently used. In particular, on considering the fluorinated gases used, the following relationship is observed:

$$\sum_i P_i \cdot M_i \cdot GWP_i \leq a \cdot P_{SF_6} \cdot M_{SF_6} \cdot GWP_{SF_6}$$

with i fluorinated gas in the mixture according to the invention, a reduction in impact (less than 0.10), $P_i$ partial pressure and $M_i$ molar mass.

According to the invention, the mixture of HFO and HFC is used in the gas form, whatever the temperature of use of the electrical switchgear. It is thus advisable for the partial pressure of each of these two components to be less than or equal to its saturated vapour pressure; if the carrier gas comprises a fluoroketone, this condition will also be met for said fluoroketone. In particular, there exists:

$$\sum_i \frac{P_i}{SVP_i} \leq 1$$

with $P_i$ partial pressure and $SVP_i$ saturated vapor pressure of the fluorinated gas i.

Depending on the apparatus, the internal pressure of the arc insulation and/or extinguishing medium which is recommended varies; in particular, for different technical reasons, it is advantageous to have a sufficiently high total pressure, generally of greater than $10^5$ Pa. As the HFO/HFC mixture is, according to the invention, entirely in the gas form at the lowest temperature of the electrical apparatus, a dilution gas, or buffer gas, is added, if need be, in order to meet the conditions of filling pressures which are given. Preferably, the dilution gas exhibits a very low boiling point, of less than or equal to the minimum temperature of use $T_{min}$ of the apparatus, and a dielectric strength greater than or equal to that of $CO_2$ or of the air under test conditions identical (same switchgear, same geometrical configuration, same operating parameters, and the like) to those used for measuring the dielectric strength of said gas.

The dilution gas can be combined with another fluorinated compound and in particular a C5K in order to enhance the dielectric performance in positive injection. Advantageously, in order to maximize the amount of each of the N fluorinated gases making up the mixture while not generating liquid phase at the minimum temperature of use of the apparatus for a mixture comprising N fluorinated compounds, including HFO and HFC, with a dilution gas, the pressures of each constituent will thus be defined by the following formula resulting from Raoult's law: wit $$P_{tot} = \frac{\sum_{i=1}^{N} P_i}{\sum_{i=1}^{N} \frac{P_i}{SVP_i}} + P_{dilution\ gas},$$

with
i ∈ {HFO, HFC, C5K};

$P_{tot}$ being the filling pressure of the apparatuses (conventionally, $P_{tot}$=1 to 1.5 bar in medium voltage and $P_{tot}$=4 to 7 bar in high voltage);

$P_i$ being the pressure of the gas concerned and $SVP_i$ being its saturated vapor pressure;

the pressures being given at the filling temperature, i.e. 20° C.

For example, for a medium voltage apparatus, for a minimum temperature of use $T_{min}$=−25° C., several compositions of mixtures might be used to fill, without formation of liquid, an electrical switchgear with a sealed chamber, the total filling pressure of which at 20° C. is 1.45 bar, that is to say $1.45 \times 10^5$ Pa, notably, for a GWP of less than or equal to 1% of that of $SF_6$:

HFO 1234yf (122.9 kPa)+HFC-227ea (7.1 kPa)+$CO_2$ (15 kPa);

HFO 1234yf (100.7 kPa)+HFC-134a (29.3 kPa)+$CO_2$ (15 kPa);

HFO 1234ze (76 kPa)+HFC 134a (29.2 kPa) completed with $CO_2$.

For example, for a high voltage apparatus, for a minimum temperature of use $T_{min}$=−30° C., several compositions of mixtures might be used to fill, without formation of liquid, an electrical switchgear with a 6 bar, that is to say $6.0 \times 10^5$ PA, chamber, in particular the mixture HFO 1234yf (100 kPa)+HFC-227ea (10 kPa)+$CO_2$ (490 kPa), the GWP of which is equal to 1.4% of that of $SF_6$.

Other examples can be found in table I below for an electrical apparatus pressure of 1.3 bar and a GWP of less than 1% of the GWP of $SF_6$. Alternatively, compositions between HFO 1234ze and HFC 227ea for different GWPs can be found in table II below. Also, compositions of a ternary mixture for different temperatures can be found in table III below. All these examples are illustrative and given solely by way of indication.

TABLE I examples of binary compositions

| | $P_{HFC}$ (MPa) | | $P_{HFO}$ (MPa) | $T_{min}$ (° C.) |
|---|---|---|---|---|
| HFC 227ea | 0.003 | HFO 1234ze | 0.0954 | −25 |
| HFC 227ea | 0.005 | HFO 1234ze | 0.0929 | −25 |
| HFC 227ea | 0.0071 | HFO 1234ze | 0.0903 | −25 |

TABLE I-continued examples of binary compositions

| | $P_{HFC}$ (MPa) | | $P_{HFO}$ (MPa) | $T_{min}$ (°C.) |
|---|---|---|---|---|
| HFC 134a | 0.02 | HFO 1234yf | 0.1214 | −25 |
| HFC 134a | 0.025 | HFO 1234yf | 0.1157 | −25 |
| HFC 134a | 0.0292 | HFO 1234yf | 0.1008 | −25 |
| HFC 134a | 0.02 | HFO 1234ze | 0.0834 | −25 |
| HFC 134a | 0.025 | HFO 1234ze | 0.0795 | −25 |
| HFC 134a | 0.0292 | HFO 1234ze | 0.0762 | −25 |
| HFC 227ea | 0.003 | HFO 1234ze | 0.1394 | −15 |
| HFC 227ea | 0.005 | HFO 1234ze | 0.1371 | −15 |
| HFC 227ea | 0.0071 | HFO 1234ze | 0.1346 | −15 |
| HFC 134a | 0.02 | HFO 1234yf | 0.185 | −15 |
| HFC 134a | 0.025 | HFO 1234yf | 0.1795 | −15 |
| HFC 134a | 0.0291 | HFO 1234yf | 0.1749 | −15 |
| HFC 134a | 0.02 | HFO 1234ze | 0.1352 | −15 |
| HFC 134a | 0.025 | HFO 1234ze | 0.1237 | −15 |
| HFC 134a | 0.0292 | HFO 1234ze | 0.1205 | −15 |
| HFC 227ea | 0.003 | HFO 1234ze | 0.079 | −30 |
| HFC 227ea | 0.005 | HFO 1234ze | 0.0761 | −30 |
| HFC 227ea | 0.0071 | HFO 1234ze | 0.073 | −30 |

TABLE II examples de binary HFO 1234ze et HFC 227ea compositions

| $T_{min}$ (°C.) | $P_{HFC}$ (MPa) | $P_{HFO}$ (MPa) | $GWP_{mixture}/GWP_{SF6}$ |
|---|---|---|---|
| −30 | 0.004 | 0.0775 | ≤1% |
| −30 | 0.02 | 0.0545 | ≤5% |
| −30 | 0.0362 | 0.0321 | ≤5% |
| −30 | 0.04 | 0.027 | ≤10% |
| −25 | 0.004 | 0.0941 | ≤1% |
| −15 | 0.004 | 0.1382 | ≤1% |
| −25 | 0.02 | 0.074 | ≤5% |
| −15 | 0.0362 | 0.1009 | ≤5% |

TABLE III examples de ternary HFO 1234ze, HFC 227ea et C5K mixtures

| $P_{HFO}$ (MPa) | $P_{HFC}$ (MPa) | $P_{C5K}$ (MPa) | $T_{min}$ (°C.) |
|---|---|---|---|
| 0.0183 | 0.015 | 0.01 | −25 |
| 0.0056 | 0.025 | 0.01 | −25 |
| 0.0673 | 0.015 | 0.01 | −15 |
| 0.0556 | 0.025 | 0.01 | −15 |

In particular, a mixture was tested in an experimental model constructed from an existing apparatus (Fluokit M24+) for a medium voltage application; the mixture is a "−15° C." mixture, that is to say a mixture not exhibiting liquid phase for temperatures greater than or equal to −15° C. It comprises HFO 1234ze (122.9 kPa)+R-227ea (7.1 kPa) completed with $CO_2$ or dry air (10 kPa)—the pressures being given for the filling at 20° C.; its GWP is equal to 1% of that of $SF_6$ with an ODP of zero. The mixture exhibits the same dielectric strength, measured by a lightning strike dielectric test, as $SF_6$ in a homogeneous field (when the ratio of the maximum field to the minimum field is equal to 3) and a dielectric strength equal to 85% of that of $SF_6$ in a very nonhomogeneous field (when the ratio of the maximum field to the minimum field is equal to 22). The resistance to partial discharges of said mixture is equal to 110% of that of $SF_6$. Its stability over time under voltage and in the presence of partial discharges is very good. The decomposition products of said mixture after temperature rise, partial discharges, outages under 24 kV and internal failure comprise neither PFIB (perfluoroisobutene) nor hydrofluoric acid (HF), two toxic products.

More generally, the used hydrofluoroolefin is an HF 1234 combined with the preferred HFCs: the miscibility between HFO 1234ze, respectively HFO 1234yf, and HFCs R-227ea, R-125 and R-134a is perfect. Furthermore, this characteristic is also found for the fluoroketone $C_6F_{10}O$, which can complete the mixture. Preferably, in order to avoid toxic decomposition products, use is made of an HFO 1234ze, which does not give HF, and an HFC R-227ea, which does not give PFIB.

In fact, in the case of failure internal to the apparatus, or in the case of an internal arc standardizing test on the apparatus, the presence of a hydrofluorocarbon HFC R-227ea or R-125 or R-134a makes it possible to suppress or delay the ignition of the hydrofluoroolefins and consequently to reduce the energy of the failure and thus to improve the behavior of the apparatuses and the protection of the personnel operating therewith. The addition of a small amount of fluoroketone C5K, in particular 10 kPa, for a mixture with a GWP≤1% of that of $SF_6$, makes it possible to enhance the performance in positive injection.

The invention claimed is:

1. A method of extinguishing electrical arcs, comprising: providing a gas medium to extinguish the electrical arcs, wherein the gas medium comprises at least one hydrofluoroolefin with three carbon atoms and one hydrofluorocarbon.

2. The method according to claim 1, wherein the hydrofluoroolefin is trans-1,3,3,3-tetrafluoro-1-propene, 2,3,3,3-tetrafluoro-1-propene or 1,2,2,5-pentafluoro-1-propene.

3. The method according to claim 1, wherein the hydrofluorocarbon is 1,1,1,2,3,3,3-heptafluoropropane, pentafluoroethane or 1,1,1,2-tetrafluoroethane.

4. The method according to claim 1, wherein the gas medium further comprises a fluoroketone.

5. The method according to claim 1, wherein the gas medium further comprises a dilution gas, wherein said dilution gas is air, oxygen, carbon dioxide or a mixture thereof.

6. The method according to claim 1, wherein partial pressure of the hydrofluorocarbon and of the hydrofluoroolefin in the gas medium is chosen as a function of a minimum temperature of an apparatus so as not to create a liquid phase according to Raoult's law at a minimum temperature of use of the apparatus.

7. The method according to claim 6, wherein the apparatus is a high or medium voltage electrical substation.

8. The method according to claim 6, wherein the minimum temperature ($T_{min}$) is −30° C., −25° C., −15° C. or 0° C.

9. The method according to claim 4, wherein the fluoroketone is decafluoro-2-methylbutan-3-one.

10. A medium voltage electrical apparatus comprising:
a sealed chamber containing electrical components; and
a gas medium, wherein the gas medium comprises a hydrofluoroolefin with three carbon atoms and a hydrofluorocarbon.

11. The electrical apparatus according to claim 10, wherein the hydrofluoroolefin is trans-1,3,3,3-tetrafluoro-1-propene, 2,3,3,3-tetrafluoro-1-propene, or 1,2,2,5-pentafluoro-1-propene, and
the hydrofluorocarbon is 1,1,1,2,3,3,3-heptafluoropropane, pentafluoroethane, or 1,1,1,2-tetrafluoroethane.

12. The electrical apparatus according to claim 10, wherein the gas medium further comprises a dilution gas.

13. The electrical apparatus according to claim 12, wherein the dilution gas is air, oxygen, carbon dioxide, or a mixture thereof.

14. The electrical apparatus according to claim 10, wherein the hydrofluoroolefin and the hydrofluorocarbon are present in the gas medium with proportions defined according to Raoult's law so as not to create a liquid phase at a minimum temperature of use of the apparatus.

15. The electrical apparatus according to claim 10, wherein said electrical apparatus is an electrical transformer with gas insulation, a line with gas insulation for transporting or distributing electricity or a connecting/disconnecting electrical apparatus.

16. The method according to claim 2, wherein the hydrofluorocarbon is 1,1,1,2,3,3,3-heptafluoropropane, pentafluoroethane or 1,1,1,2-tetrafluoroethane.

17. The method according to claim 16, further comprising adding a dilution gas to the gas medium, wherein the dilution gas is air, oxygen, carbon dioxide or a mixture thereof, and
   wherein partial pressure of the hydrofluorocarbon and of the hydrofluoroolefin in the gas medium is chosen as a function of a minimum temperature of an apparatus so as not to create liquid phase according to Raoult's law at a minimum temperature of use of the apparatus.

18. The electrical apparatus according to claim 13, wherein said electrical apparatus is an electrical transformer with gas insulation, a line with gas insulation for transporting or distributing electricity or a connecting/disconnecting electrical apparatus.

19. The electrical apparatus according to claim 15, wherein the hydrofluoroolefin and the hydrofluorocarbon are present in the gas medium with proportions defined according to Raoult's law so as not to create liquid phase at a minimum temperature of use of the apparatus.

* * * * *